US012325016B2

(12) United States Patent
Avis et al.

(10) Patent No.: US 12,325,016 B2
(45) Date of Patent: Jun. 10, 2025

(54) METHOD OF TREATING EXHAUST GAS AND SYSTEM FOR SAME

(71) Applicant: JOHNSON MATTHEY PUBLIC LIMITED COMPANY, London (GB)

(72) Inventors: Daniel Avis, Royston (GB); Rafal Baran, Reading (GB); Gavin Brown, Royston (GB); Alexander Green, Royston (GB); Neil Greenham, Royston (GB); Matthew Harris, Royston (GB); Oliver Hemming, Billingham (GB); Carmelo Iacono, Reading (GB); Caitlin Jenkins, Reading (GB); Alanna Murphy, Royston (GB); Paul Phillips, Royston (GB)

(73) Assignee: Johnson Matthey Public Limited Company, London (GB)

(*) Notice: Subject to any disclaimer, the term of this patent is extended or adjusted under 35 U.S.C. 154(b) by 143 days.

(21) Appl. No.: 18/301,310

(22) Filed: Apr. 17, 2023

(65) Prior Publication Data

US 2023/0347326 A1 Nov. 2, 2023

(30) Foreign Application Priority Data

Apr. 27, 2022 (EP) .................................. 22170336

(51) Int. Cl.
| | | |
|---|---|---|
| *B01J 29/76* | (2006.01) | |
| *B01D 53/94* | (2006.01) | |
| *B01J 23/72* | (2006.01) | |
| *B01J 35/00* | (2024.01) | |
| *F01N 3/20* | (2006.01) | |
| *F01N 3/28* | (2006.01) | |

(52) U.S. Cl.
CPC ...... *B01J 29/7615* (2013.01); *B01D 53/9418* (2013.01); *B01D 53/9472* (2013.01); *B01D 53/9495* (2013.01); *B01J 23/72* (2013.01); *B01J 35/19* (2024.01); *F01N 3/208* (2013.01); *F01N 3/2828* (2013.01); *B01D 53/9422* (2013.01); *B01D 53/9436* (2013.01); *B01D 2251/2062* (2013.01); *B01D 2255/20738* (2013.01); *B01D 2255/20761* (2013.01); *B01D 2255/502* (2013.01); *B01D 2255/9032* (2013.01); *F01N 3/206* (2013.01); *F01N 3/2066* (2013.01); *F01N 2370/04* (2013.01); *F01N 2560/021* (2013.01); *F01N 2610/02* (2013.01); *F01N 2610/1453* (2013.01); *F01N 2900/1614* (2013.01); *F01N 2900/1616* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,894,952 | B1* | 11/2014 | Choung | B01D 53/9418 60/299 |
| 2010/0313548 | A1* | 12/2010 | Theis | F01N 3/208 60/276 |
| 2012/0294792 | A1* | 11/2012 | Southward | B01J 29/061 423/351 |
| 2014/0311135 | A1* | 10/2014 | Miyagawa | F02D 41/0025 60/287 |
| 2016/0001226 | A1* | 1/2016 | Teysset | B01D 53/9477 423/213.2 |
| 2017/0298796 | A1* | 10/2017 | Naseri | F01N 13/0093 |
| 2018/0043305 | A1 | 2/2018 | Voss et al. | |
| 2018/0296979 | A1* | 10/2018 | Tsuji | B01J 37/0248 |
| 2019/0001268 | A1* | 1/2019 | Chen | F01N 3/103 |
| 2019/0283011 | A1* | 9/2019 | Chen | B01D 53/9436 |
| 2021/0229035 | A1 | 7/2021 | Granger | |

FOREIGN PATENT DOCUMENTS

| | | |
|---|---|---|
| EP | 1 064 094 B1 | 9/2002 |
| EP | 3 315 188 A1 | 5/2018 |
| WO | 2015/085303 A1 | 6/2015 |
| WO | 2022090468 A1 | 5/2022 |

OTHER PUBLICATIONS

Girard, et al., "Combined Fe—Cu SCR Systems with Optimized Ammonia to NOx Ratio for Diesel NOx Control", SAE International Journal of Fuels and Lubricants, pp. 603-610, Apr. 1, 2009.
Higgins, et al., "The framework topology of zeolite beta", Zeolites 8, pp. 446-452, 1988.
Newsman, et al., "Structural characterization of zeolite beta", Proc. R. Soc. Lond. A 420, pp. 375-405, 1988.
Theis, "Selective Catalytic Reduction for Treating the NOx Emissions from Lean-Burn Gasoline Engines: Performance Assessment", Ford Motor Company, SAE Int. J. Fuels Lubr., vol. 1, Issue 1, pp. 364-375, 2008.

* cited by examiner

*Primary Examiner* — Binh Q Tran
(74) *Attorney, Agent, or Firm* — BakerHostetler

(57) ABSTRACT

A method of treating exhaust gas from a lean burn internal combustion engine is disclosed. The method comprises: introducing ammonia or an ammonia precursor into the exhaust gas upstream of an Fe-SCR catalyst, the Fe-SCR catalyst comprising iron and a zeolite; and contacting the exhaust gas with the Fe-SCR catalyst; wherein the amount of ammonia or ammonia precursor introduced into the exhaust gas upstream of the Fe-SCR catalyst is controlled to provide an ammonia-to-$NO_x$ molar ratio (ANR) in the exhaust gas contacting the Fe-SCR catalyst of from greater than 2 to 6.

19 Claims, No Drawings

METHOD OF TREATING EXHAUST GAS AND SYSTEM FOR SAME

FIELD OF THE INVENTION

The present invention relates to a method of treating exhaust gas, a system for treating exhaust gas, a use of the system and a use of an Fe-SCR catalyst.

BACKGROUND OF THE INVENTION

Selective catalytic reduction (SCR) of oxides of nitrogen ($NO_x$) by nitrogenous compounds, such as ammonia or the ammonia precursor urea, was first developed for treating industrial stationary applications. SCR technology was first used in thermal power plants in Japan in the late 1970s and has seen widespread application in Europe since the mid-1980s. In the U.S.A., SCR systems were introduced for gas turbines in the 1990s and have been used more recently in coal-fired powerplants. In addition to coal-fired cogeneration plants and gas turbines, SCR applications include plant and refinery heaters and boilers in the chemical processing industry, furnaces, coke ovens, municipal waste plants and incinerators. More recently, $NO_x$ reduction systems based on SCR technology are being developed for a number of vehicular (mobile) applications in Europe, Japan, and the U.S.A., e.g. for treating diesel exhaust gas.

Several chemical reactions occur in an $NH_3$ SCR system, all of which represent desirable reactions that reduce $NO_x$ to nitrogen. The dominant reaction is represented by reaction (1).

$$4NO+4NH_3+O_2 \rightarrow 4N_2+6H_2O \quad (1)$$

Competing, non-selective reactions with oxygen can produce secondary emissions or may unproductively consume ammonia. One such non-selective reaction is the complete oxidation of ammonia, shown in reaction (2).

$$4NH_3+5O_2 \rightarrow 4NO+6H_2O \quad (2)$$

Also, side reactions may lead to undesirable products such as $N_2O$, as represented by reaction (3).

$$4NH_3+5NO_2+3O_2 \rightarrow 4N_2O+6H_2O \quad (3)$$

Since, in reaction (1), there is a 1:1 (i.e., stoichiometric) molar relationship between NO and $NH_3$, in practical systems the alumina-to-$NO_x$ molar ratio (ANR) is controlled at around 1 to 1.5. This achieves a desirable balance between the $NO_x$ conversion performance of the SCR catalyst and the potential for excess ammonia to "slip" through the exhaust system and be released into the atmosphere.

Aluminosilicate zeolites are used as catalysts for SCR of $NO_x$ with $NH_3$. One application is to control $NO_x$ emissions from vehicular diesel engines, with the reductant obtainable from an ammonia precursor such as urea or by injecting ammonia per se. To promote the catalytic activity, transition metals are incorporated into the aluminosilicate zeolites. The most commonly tested transition metal zeolites are Cu/ZSM-5, Cu/Beta, Fe/ZSM-5 and Fe/Beta because they have a relatively wide temperature activity window. In general, Cu-based zeolite catalysts show better low temperature $NO_x$ reduction activity than iron-based zeolite catalysts.

WO 2008/106519 A1 relates to a known Cu-CHA zeolite SCR catalyst and in particular to its performance at low temperatures. Comparative Example 11 relates to a Cu/Beta catalyst and Example 10 relates to a Cu/Y zeolite catalyst, for example. As expected, in the testing examples the ANR is controlled at about 1.

Joseph R. Theis, Ford Motor Company, SAE Int. J. Fuels Lubr., Vol. 1, Issue 1, 364-375, 2008 relates to a series of performance assessment tests in relation to SCR catalysts for lean burn gasoline engines. Multiple different parameters were tested in lab conditions.

There is a continued need to improve SCR catalysis and, in particular, $NO_x$ conversion performance, particularly at low temperatures.

SUMMARY OF THE INVENTION

One aspect of the present disclosure is directed to a method of treating exhaust gas from a lean burn internal combustion engine, the method comprising: introducing ammonia or an ammonia precursor into the exhaust gas upstream of an Fe-SCR catalyst, the Fe-SCR catalyst comprising iron and a zeolite; and contacting the exhaust gas with the Fe-SCR catalyst; wherein the amount of ammonia or ammonia precursor introduced into the exhaust gas upstream of the Fe-SCR catalyst is controlled to provide an ammonia-to-$NO_x$ molar ratio (ANR) in the exhaust gas contacting the Fe-SCR catalyst of from greater than 2 to 6.

Another aspect of the present disclosure is directed to a system for treating exhaust gas from a lean burn internal combustion engine, the system comprising: a reductant injector for introducing ammonia or an ammonia precursor into the exhaust gas; a substrate; an Fe-SCR catalyst contained within or disposed on the substrate, the Fe-SCR catalyst comprising iron and a zeolite; and an engine control unit; wherein the reductant injector is located upstream of the Fe-SCR catalyst; and wherein the engine control unit is configured to control the amount of ammonia or ammonia precursor introduced into the exhaust gas by the reductant injector during use such that the ammonia-to-$NO_x$ molar ratio (ANR) in the exhaust gas contacting the Fe-SCR catalyst is from greater than 2 to 6.

Another aspect of the present disclosure is directed to the use of the system of the above aspect in a method according to the first aspect.

Another aspect of the present disclosure is directed to the use of an Fe-SCR catalyst, the Fe-SCR catalyst comprising iron and a zeolite, and an ANR of from greater than 2 to 6 to treat exhaust gas from a lean burn internal combustion engine containing 100 ppm or less $NO_x$.

DETAILED DESCRIPTION OF THE INVENTION

The present invention seeks to tackle at least some of the problems associated with the prior art or at least to provide a commercially acceptable alternative solution thereto.

In a first aspect, the present invention provides a method of treating exhaust gas from a lean burn internal combustion engine, the method comprising:
  introducing ammonia or an ammonia precursor into the exhaust gas upstream of an Fe-SCR catalyst, the Fe-SCR catalyst comprising iron and a zeolite; and
  contacting the exhaust gas with the Fe-SCR catalyst;
  wherein the amount of ammonia or ammonia precursor introduced into the exhaust gas upstream of the Fe-SCR catalyst is controlled to provide an ammonia-to-$NO_x$ molar ratio (ANR) in the exhaust gas contacting the Fe-SCR catalyst of from greater than 2 to 6.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when the method of this aspect is performed, in particular due to the combination of the Fe-SCR catalyst and the particular high ANR (without wishing to be bound by theory), an unexpectedly high $NO_x$ conversion performance has been observed. This improvement has been observed relative to a similar Cu-SCR catalyst, in particular. This goes against the current "standard" methods in which the ANR is generally kept at below 2, and preferably around from 1 to 1.5.

When increasing the ANR in an SCR reaction, one would naturally expect the $NO_x$ conversion performance to somewhat increase. This is because the concentration of the reductant, ammonia, in the exhaust gas is being increased. However, surprisingly, it has been observed that for the Fe-SCR catalysts described herein in particular, as the ANR increases above 2 the $NO_x$ conversion performance increases by a much greater amount than would be expected and, importantly, to a greater extent than comparative SCR catalysts, such as a Cu-SCR catalyst. For example, it might be expected that the $NO_x$ conversion performance of both Fe-SCR and Cu-SCR catalysts would increase at the same or a similar rate with increasing ANR. Cu-SCR catalysts may also be preferred at low temperatures, and therefore one may expect Cu-SCR catalysts to perform better at low temperatures. However, a substantial increase in performance has been observed for the Fe-SCR catalyst relative to the corresponding Cu-SCR catalyst as the ANR is increased above 2, particularly at low temperatures.

There is also a "trade-off" between increasing the ANR and level of $NO_x$ performance. This is because the higher the ANR, the greater the potential for "ammonia slip" in the exhaust system, i.e. the undesirable result that unreacted ammonia reductant passes through the exhaust system to and is released into the atmosphere. However, due to the increased $NO_x$ conversion that may be exhibited at such ANRs in the method of the present invention, this benefit may outweigh the risk of increased ammonia slip in the system, particularly in low-temperature and/or low-$NO_x$ conditions. Thus, against the teaching in the field, a higher ANR may be beneficial in certain circumstances, in combination with an Fe-SCR catalyst as described herein.

These advantages could not be expected from WO 2008/106519 A1, which may be considered to represent some standard SCR practices in the field. Starting from this document, one may expect to use a Cu-SCR catalyst to achieve improvements in SCR catalysis at low temperatures. Moreover, no discussion of varying the ANR is given. The Theis paper also does not discuss the effects of increased ANR in combination with an Fe-SCR catalyst.

The term "lean burn internal combustion engine" as used herein takes on its usual meaning in the art, such as an internal combustion engine that burns fuel in an excess of air.

The term "ammonia precursor" as used herein encompasses any compound that may decompose into ammonia when released into an exhaust system, for example. Typical ammonia precursors used in the field of the present invention include urea, hydrazine, ammonium carbonate, ammonium carbamate, ammonium hydrogen carbonate and ammonium formate.

The term "upstream" as used herein refers to the relative location of a feature within an exhaust system. In particular, the term "upstream" as used herein refers to a feature being closer to the source of exhaust gas along the path of the exhaust gas within an exhaust system. As such, the term "downstream" as used herein refers to a feature being further away from the source of exhaust gas along the path of the exhaust gas within an exhaust system. It will also be recognised that an exhaust system including a means such as an injector for introducing reductant or reductant precursor and a SCR catalyst is necessarily oriented from upstream to downstream so that the introduction of reductant (or its precursor) is done upstream from the SCR catalyst. If the orientation were reversed and reductant (or its precursor) were introduced only downstream from the SCR catalyst, the SCR catalyst would have no reductant source to perform its required function of reducing oxides of nitrogen. In this context, therefore, the terms "upstream" and "downstream" used in connection with the exhaust system impose a definite orientation so that the exhaust system is not merely suitable to be oriented in either direction.

The term "SCR" as used herein means "selective catalytic reduction", as is known in the art. The term "SCR" as used herein encompasses the reduction (i.e. catalytic removal) of $NO_x$ present in an exhaust gas by a catalyst in the presence of a reductant, such as ammonia or an ammonia precursor.

The Fe-SCR catalyst comprises iron and a zeolite. Typically, the iron is disposed on the zeolite. The term "disposed on" in the context of a metal being "disposed on a zeolite", for example, in the context of the present invention may encompass having the metal supported on the surface of the zeolite or within the pores thereof, but the zeolite is preferably "ion exchanged with" Fe.

The term "zeolite" as used herein takes on its usual meaning in the art. The term "zeolite" encompasses aluminosilicate molecular sieves, and is further defined and categorised, as is known to those skilled in the field, by the International Zeolite Association.

Preferably, the amount of ammonia or ammonia precursor introduced into the exhaust gas upstream of the Fe-SCR catalyst is controlled to provide an ANR in the exhaust gas contacting the Fe-SCR catalyst of from 3 to 5, more preferably from 4 to 5. In some preferred embodiments, the amount of ammonia or ammonia precursor introduced into the exhaust gas upstream of the Fe-SCR catalyst is controlled to provide an ANR in the exhaust gas contacting the Fe-SCR catalyst of greater than 2.5. It has been surprisingly found that the above-described effects of increased $NO_x$ conversion performance may be observed even more strongly at such ANRs. For example, surprisingly, the difference between the $NO_x$ conversion performance of the Fe-SCR catalysts described herein and comparable SCR catalysts, such as Cu-SCR catalysts may be even greater at such ratios. This goes against the current "standard" methods in which the ANR is generally kept at below 2, and preferably around from 1 to 1.5.

The $NO_x$ concentration in the exhaust gas contacting the Fe-SCR catalyst may not be particularly limited, and the above-described affects may also be observed at high $NO_x$ concentrations, such as greater than 100 ppm, for example from 150 ppm to 1100 ppm. However, preferably, the $NO_x$ concentration in the exhaust gas contacting the Fe-SCR catalyst is 100 ppm or less. More preferably, the $NO_x$ concentration in the exhaust gas contacting the Fe-SCR catalyst is 50 ppm or less, even more preferably 10 ppm or less. The method of the present invention may be particularly suitable and advantageous at such low $NO_x$ concentrations. In other words, the advantages of the Fe-SCR catalysts described herein relative to other SCR catalysts, such as Cu-SCR catalysts, may be particularly apparent at such low $NO_x$ concentrations. Moreover, the method of the present invention may be particularly suitable for such exhaust gas conditions. This is because at such low $NO_x$ concentrations, even when the ANR is high, the absolute ammonia concentrations in the exhaust gas may still remain relatively low. Thus, the risks associated with (absolute) ammonia slip may also remain low.

Preferably, the ratio of concentration of NO to concentration of $NO_x$ in the exhaust gas contacting the Fe-SCR catalyst is 0.8 or greater, more preferably 0.9 or greater. The method of the present invention may be particularly suitable for such exhaust gas conditions.

Preferably, the method further comprises reducing the concentration of $NO_x$ in the exhaust gas prior to the step of introducing ammonia or an ammonia precursor into the exhaust gas. For example, preferably the concentration of $NO_x$ in the exhaust gas exiting the lean burn internal combustion engine is greater than 100 ppm and reducing the concentration of $NO_x$ in the exhaust gas prior to the step of introducing ammonia or an ammonia precursor into the exhaust gas reduces the concentration of $NO_x$ in the exhaust gas to 100 ppm or less, preferably 50 ppm or less, more preferably 10 ppm or less. Reducing the concentration of $NO_x$ in the exhaust gas prior to the step of introducing ammonia or an ammonia precursor into the exhaust gas may be achieved by, preferably, contacting the exhaust gas with a further SCR catalyst, an oxidation catalyst and/or a passive $NO_x$ adsorber (PNA) catalyst. Preferably, the further SCR catalyst comprises a Cu-SCR catalyst, the Cu-SCR catalyst comprising copper and a zeolite. The copper is typically disposed on the zeolite. Preferably, the Cu-SCR catalyst comprises copper disposed on a small-pore zeolite, such as an AEI or CHA zeolite. Preferably, the oxidation catalyst comprises a diesel oxidation catalyst (DOC). Preferably, the DOC comprises a platinum group metal, such as platinum, disposed on a support material, such as alumina. Preferably, the PNA catalyst comprises a platinum group metal (PGM), preferably palladium, disposed on a small-pore zeolite, preferably having a Framework Type comprising CHA and/or AEI. The term "platinum group metal" as used herein may encompass one or more of iridium, osmium, palladium, platinum, rhodium, and ruthenium. The term "passive $NO_x$ adsorber" or "PNA" as used herein may encompass a catalyst that is effective to adsorb $NO_x$ at or below a low temperature and release the adsorbed $NO_x$ at temperatures above the low temperature, for example. Suitable PNAs are discussed in WO 2015/085303A1, for example. Such methods may help achieve the low-$NO_x$ exhaust gas conditions that may enable the advantages described above.

The method of the present invention may be particularly applicable to the type of exhaust gas generated by lean burn engines, particularly vehicular lean-burn engines. For example, preferably, the lean burn internal combustion engine is a diesel engine, a hydrogen engine or an engine powered by liquid petroleum gas or natural gas. The lean burn internal combustion engine is most preferably a diesel engine. Preferably, the lean burn internal combustion engine is not a gasoline engine.

Preferably, the temperature of the exhaust gas contacting the Fe-SCR catalyst is 500° C. or less. More preferably, the temperature of the exhaust gas contacting the Fe-SCR catalyst is 350° C. or less, even more preferably 300° C. or less, still more preferably 200° C. or less. Although the surprising and advantageous effects described herein may be observed at higher temperatures, the improved $NO_x$ conversion performance of the Fe-SCR catalysts at the higher ANRs is particularly evident at lower exhaust gas temperatures, especially relative to the comparative SCR catalysts.

The method of the present invention may therefore be particularly applicable during the cold-start period of the engine, while the engine temperature remains relatively cold. There is a strong desire in the field to improve the NO conversion performance of SCR catalysts during the cold-start (low temperature SCR) period, for instance, and therefore such an advantage may be very important.

At such low temperatures, urea (i.e., ammonia precursor) hydrolysis may be less likely to occur. However, heated urea injectors may be used.

Accordingly, preferably, in the method of the present invention when the temperature of the exhaust gas contacting the Fe-SCR catalyst is at a predetermined threshold temperature or less, the amount of ammonia or ammonia precursor introduced into the exhaust gas upstream of the Fe-SCR catalyst is controlled to provide an ANR in the exhaust gas contacting the Fe-SCR catalyst of from greater than 2 to 6; and when the temperature of the exhaust gas contacting the Fe-SCR catalyst is greater than the threshold temperature, the amount of ammonia or ammonia precursor introduced into the exhaust gas upstream of the Fe-SCR catalyst is controlled to provide an ANR in the exhaust gas contacting the Fe-SCR catalyst of 2 or less. More preferably, when the temperature of the exhaust gas contacting the Fe-SCR catalyst is at the predetermined threshold temperature or less, the amount of ammonia or ammonia precursor introduced into the exhaust gas upstream of the Fe-SCR catalyst is controlled to provide an ANR in the exhaust gas contacting the Fe-SCR catalyst of from 3 to 5. In other words, in some preferred embodiments, the method of the present invention is only used while the engine is in the cold-start period, and then once the engine has warmed up so that the temperature of the exhaust gas is above a threshold temperature, a standard method known in the art is used in which the ANR is kept within a typical range. As such, once the engine has warmed up and the advantages of the high ANR may not be as significant, the amount ANR may be reduced so that the risk of ammonia slip may be reduced.

Preferably, the threshold temperature is 500° C., more preferably 350° C., even more preferably 300° C., still more preferably 200° C. for the reasons discussed above.

Preferably, the zeolite of the Fe-SCR catalyst comprises zeolite having a Framework Type selected from one or more of AFX, AEI, BEA, FER, MFI, FAU, LTA, LTL, CHA, or mixtures or intergrowths thereof, more preferably AEI, AFX, BEA, FER, MFI, FAU, or mixtures or intergrowths thereof. BEA zeolites include beta zeolite. The framework topology of zeolite beta is discussed in JB Higgins et al., Zeolites 8, 446-452 (1988); and in JM Newsam et al., Proc. R. Soc. Lond. A 420, 375-405 (1988). FER zeolites include ferrierite. MFI zeolites include ZSM-5, for example. FAU zeolites include zeolite X and zeolite Y. AEI zeolites include SSZ-39. AFX zeolites include SSZ-16. Such Framework Types are known to those skilled in the art and are defined by the International Zeolite Association. Preferably, the zeolite of the Fe-SCR catalyst comprises a medium-pore and/or large-pore zeolite. Such zeolites may be particularly effective at allowing the Fe-SCR catalyst to exhibit the above-described advantageous high NOx conversion at high ANRs.

The term "small-pore zeolite" as used herein may encompass a zeolite having a maximum ring size of eight tetrahedral atoms. The term "medium-pore zeolite" as used herein may encompass a zeolite having a maximum ring size of ten tetrahedral atoms. The term "large-pore zeolite" as used herein may encompass a zeolite having a maximum ring size of twelve tetrahedral atoms.

Preferably, the zeolite of the Fe-SCR catalyst comprises a zeolite having a Framework Type comprising AEI, AFX, BEA and/or FER, preferably BEA. Preferably, the zeolite of the Fe-SCR catalyst is beta zeolite. BEA zeolites, such as beta zeolite, have been shown to be particularly applicable to the method of the present invention in order to achieve the advantages described herein. However, unfortunately, BEA zeolites may not be particularly thermally durable, particularly in the harsh temperature environments experienced by exhaust gas catalysts. Fe-FER catalysts may achieve similar levels of $NO_x$ conversion to Fe-BEA catalysts and may exhibit greater thermal durability. Accordingly, FER zeolites may also be preferred.

Preferably, the zeolite of the Fe-SCR catalyst has a silica-to-alumina molar ratio (SAR) of from about 7 to about 50, more preferably from about 10 to about 35, even more preferably about 20 to about 30, still more preferably about 22 to about 28. Such zeolites may be particularly effective at allowing the Fe-SCR catalyst to exhibit the above-described advantageous high $NO_x$ conversion at high ANRs. For example, when the zeolite of the Fe-SCR catalyst comprises a zeolite having a Framework Type comprising BEA and/or FER, the zeolite of the Fe-SCR catalyst preferably has a SAR of about 25; AEI preferably has a SAR of 20.

Preferably, the zeolite of the Fe-SCR catalyst comprises iron disposed on the zeolite at a loading of from about 1 to about 7 wt. %, based on the weight of the zeolite, preferably about 2 to about 5 wt. %, most preferably about 3 wt. %.

In some preferred embodiments, the Fe-SCR catalyst further comprises copper disposed on the zeolite. As such, advantages associated with the presence of each of copper and iron, respectively, may be utilised. In this regard, the results of the Example suggest generally that for a lean burn internal combustion engine that emits relatively cool exhaust gas or is located in a location where the exhaust gas is relatively cool, e.g., <300° C., improved $NO_x$ conversion can be obtained using a Fe-SCR catalyst and contacting the catalyst with ANR at greater than 2 to 6.

However, further, if the exhaust gas of the lean burn internal combustion engine in dynamic operation spans the temperature ranges of <300° C. and >300° C., the exhaust system can be designed to combine a Fe-SCR zeolite catalyst and a Cu-SCR zeolite catalyst with appropriate control of ANR to include an ANR at greater than 2 to 6 preferably at lower temperatures where the Fe-SCR zeolite catalyst is more active; and lower ANR at higher temperatures where the Cu-SCR zeolite catalyst may be more active, thereby improving NO conversion across a wider temperature window. Configurations combining Fe-SCR zeolite catalyst and Cu-SCR zeolite catalysts include layered arrangements, mixtures of both catalysts and zone-coated (side-by-side) monolith substrates.

Preferably, the Fe-SCR catalyst is contained within or disposed on a substrate, the substrate comprising two or more catalyst zones and the Fe-SCR catalyst being contained within a first catalyst zone.

The term "substrate" as used herein may encompass, for example, a ceramic or metallic honeycomb, or a filter block, e.g., a wall flow filter or flow-through substrate. The substrate may comprise a monolithic (or monolith) substrate. The substrate may comprise a ceramic monolith substrate. The substrate may vary in its material composition, size and configuration, cell shape and density, and wall thickness. Suitable substrates are known in the art.

The term "contained within" in the context of this feature may encompass an embodiment in which the substrate is an extruded substrate, for example, i.e., when the Fe-SCR catalyst is incorporated into the extrudate when forming the extruded substrate.

The term "disposed on" in the context of this feature may encompass both having the Fe-SCR catalyst directly disposed on the substrate, i.e., with no intervening material, and/or indirectly disposed on the substrate, i.e., with intervening material. If the substrate is porous, then the term "disposed on" may also encompass having the Fe-SCR catalyst disposed therein, for example within the pores of the substrate, i.e., wherein the Fe-SCR catalyst is disposed thereon and/or therein. The Fe-SCR catalyst may be disposed on the substrate in the form of a washcoat.

The term "catalyst zone" as used herein encompasses a defined area of the substrate that is distinguishable from another area of the substrate, for example due to having a different catalyst composition contained therein or disposed thereon. The "zone" typically has distinct boundaries or edges (i.e., it is possible to distinguish one zone from another zone using conventional analytical techniques). Moreover, the term "zone" as used herein refers to a region having an axial length that is less than the total axial length of the substrate, such as ≤75% of the total length of the substrate. A "zone" typically has a length (i.e., a substantially uniform length) of at least 5% (e.g., ≥5%) of the total length of the substrate, e.g., preferably ≥30%, more preferably ≥40%.

The substrate can comprise a wall flow filter substrate, but in a preferred embodiment, the substrate comprises a flow-through substrate. The substrate may be a "blank", i.e., un-washcoated, substrate prior to application of the Fe-SCR catalyst. Alternatively, the substrate may have one or more washcoats already loaded thereon. In such a situation, the final catalyst article may comprise multiple layers of different washcoats. The substrate preferably comprises cordierite. However, the composition of the substrate is not particularly limited. The term "washcoat" as used herein is well known in the field and refers to an adherent coating that is applied to a substrate usually during the production of a catalyst.

Preferably, a Cu-SCR catalyst is contained in a second catalyst zone different from the first catalyst zone, the Cu-SCR catalyst comprising copper and a zeolite. The second catalyst zone is typically supported on the surface of the substrate and abuts the Fe-SCR catalyst zone or minimally overlaps the Fe-SCR catalyst (or—depending on the order of application of the Fe-SCR catalyst and the Cu-SCR catalyst washcoats—the Fe-SCR catalyst can minimally overlap the Cu-SCR catalyst; "minimal overlap" defining an unintended overlap to allow for "real World" depth of coating tolerances obtainable during manufacture). The copper is typically disposed on the zeolite. The zeolite may comprise a small-pore zeolite, such as AEI or CHA, for example.

Preferably, the second catalyst zone is located upstream of the first catalyst zone. This may be a particularly preferred arrangement of catalyst zones.

If copper is not necessarily present in the Fe-SCR catalyst, then the method preferably further comprises contacting the exhaust gas with a Cu-SCR catalyst prior to contacting the exhaust gas with the Fe-SCR catalyst, the Cu-SCR catalyst comprising copper and a zeolite, wherein the Cu-SCR catalyst is located in a close coupled position upstream of the Fe-SCR catalyst. The preferred Cu-SCR catalysts described elsewhere herein apply equally to this embodiment.

The method preferably further comprises contacting the exhaust gas with a Cu-SCR catalyst downstream of the Fe-SCR catalyst, the Cu-SCR catalyst comprising copper and a zeolite, wherein the Cu-SCR catalyst is located downstream of the Fe-SCR catalyst in an underfloor position. The preferred Cu-SCR catalysts described elsewhere herein apply equally to this embodiment.

Preferably, the ammonia precursor comprises urea. Other suitable ammonia precursors may include hydrazine, ammonium carbonate, ammonium carbamate, ammonium hydrogen carbonate or ammonium formate.

In a further aspect, the present invention provides a system for treating exhaust gas from a lean burn internal combustion engine, the system comprising:
- a reductant injector for introducing ammonia or an ammonia precursor into the exhaust gas;
- a substrate;
- an Fe-SCR catalyst contained within or disposed on the substrate, the Fe-SCR catalyst comprising iron and a zeolite; and
- an engine control unit;
- wherein the reductant injector is located upstream of the Fe-SCR catalyst; and
- wherein the engine control unit is configured to control the amount of ammonia or ammonia precursor introduced into the exhaust gas by the reductant injector during use such that the ammonia-to-$NO_x$ molar ratio (ANR) in the exhaust gas contacting the Fe-SCR catalyst is from greater than 2 to 6.

The term "reductant injector" may encompass any device suitable for releasing or injecting the ammonia or ammonia precursor into the exhaust gas stream. Suitable reductant injectors are known in the art and can included heated injector nozzles to promote thermal decomposition of ammonia precursors, such as urea.

The engine control unit being configured to control the amount of ammonia or ammonia precursor introduced into the exhaust gas by the reductant injector during use may encompass that the engine control unit is pre-programmed to provide such a function. For example, the engine control unit may react to signals received from a $NO_x$ sensor (i.e., providing data on the $NO_x$ concentration in the exhaust gas) upstream of the reductant injector and control the amount of reductant released by the reductant injector accordingly, such that the desired ANR is maintained using such a feedback loop. As an alternative to a $NO_x$ sensor, which measures the $NO_x$ concentration directly, the $NO_x$ concentration can be determined indirectly using pre-correlated look-up tables or maps (stored in the control unit) correlating any other suitable parameters of the condition of the engine with the predicted $NO_x$ concentration in the exhaust gas, for example.

The surprising advantages associated with the method of the first aspect apply equally to this aspect.

Preferably, the system further comprises the lean burn internal combustion engine.

Preferably, the engine control unit is configured to control the amount of ammonia or ammonia precursor introduced into the exhaust gas by the reductant injector during use such that the ANR in the exhaust gas contacting the Fe-SCR catalyst is from 3 to 6.

Preferably, the system comprises a further SCR catalyst, an oxidation catalyst and/or a PNA catalyst upstream of the Fe-SCR catalyst. As such, the $NO_x$ concentration of the exhaust gas may be reduced prior to contacting the Fe-SCR catalyst.

Preferably, the lean burn internal combustion engine is not a gasoline engine. Use of the system of the present invention may be particularly applicable to the type of exhaust gas generated by such engines. For example, preferably, the lean burn internal combustion engine is a diesel engine, a hydrogen engine or an engine powered by liquid petroleum gas or natural gas. The lean burn internal combustion engine is most preferably a diesel engine.

Preferably, the zeolite of the Fe-SCR catalyst comprises zeolite having a Framework Type selected from one or more of AEI, AFX, BEA, FER, MFI, FAU, LTA, LTL, CHA, or mixtures or intergrowths thereof, more preferably AEI, AFX, BEA, FER, MFI, FAU, or mixtures or intergrowths thereof. BEA zeolites include beta zeolite. FER zeolites include ferrierite. MFI zeolites include ZSM-5, for example. FAU zeolites include zeolite X and zeolite Y. AEI zeolites include SSZ-39. AFX zeolites include SSZ-16. Such Framework Types are known to those skilled in the art and are defined by the International Zeolite Association. Preferably, the zeolite of the Fe-SCR catalyst comprises a medium-pore and/or large-pore zeolite. Such zeolites may be particularly effective at allowing the Fe-SCR catalyst to exhibit the above-described advantageous high $NO_x$ conversion at high ANRs.

Preferably, the zeolite of the Fe-SCR catalyst comprises a zeolite having a Framework Type comprising AEI, AFX, BEA and/or FER, preferably BEA. Preferably, the zeolite of the Fe-SCR catalyst is beta zeolite. BEA zeolites, such as beta zeolite, have been shown to be particularly applicable for use in the system of the present invention in order to achieve the advantages described herein. However, unfortunately, BEA zeolites may not be particularly thermally durable, particularly in the harsh temperature environments experienced by exhaust gas catalysts. Fe-FER catalysts may achieve similar levels of $NO_x$ conversion to Fe-BEA catalysts and may exhibit greater thermal durability. Accordingly, FER zeolites may also be preferred.

Preferably, the zeolite of the Fe-SCR catalyst has a silica-to-alumina molar ratio (SAR) of from about 15 to about 50, more preferably from about 15 to about 35, even more preferably about 20 to about 30, still more preferably about 22 to about 28. Such zeolites may be particularly effective at allowing the Fe-SCR catalyst to exhibit the above-described advantageous high NOx conversion at high ANRs. For example, when the zeolite of the Fe-SCR catalyst comprises a zeolite having a Framework Type comprising BEA and/or FER, the zeolite of the Fe-SCR catalyst preferably has a SAR of about 25.

Preferably, the zeolite of the Fe-SCR catalyst comprises iron disposed on the zeolite at a loading of from about 1 to about 7 wt. %, based on the weight of the zeolite, preferably about 2 to about 5 wt. %, most preferably about 3 wt. %.

In some preferred embodiments, the Fe-SCR catalyst further comprises copper disposed on the zeolite. As such, advantages associated with the presence of each of copper and iron, respectively, may be utilised.

Preferably, the substrate comprises two or more catalyst zones, the Fe-SCR catalyst being contained within a first catalyst zone.

Preferably, the substrate comprises a wall flow filter substrate. In an alternative preferred embodiment, the substrate comprises a flow-through substrate. The substrate may be a "blank", i.e. un-washcoated, substrate. Alternatively, the substrate may have one or more washcoats already loaded thereon. In such a situation, the final catalyst article may comprise multiple layers of different washcoats. The substrate preferably comprises cordierite. However, the composition of the substrate is not particularly limited.

Preferably, a Cu-SCR catalyst is contained in a second catalyst zone different to the first catalyst zone, the Cu-SCR catalyst comprising copper and a zeolite. The copper is typically disposed on the zeolite. The zeolite may comprise a small-pore zeolite, such as AEI or CHA, for example.

Preferably, the second catalyst zone is located upstream of the first catalyst zone. This may be a particularly preferred arrangement of catalyst zones.

If copper is not necessarily present in the Fe-SCR catalyst, then the system preferably further comprises a Cu-SCR catalyst located in a close coupled position upstream of the Fe-SCR catalyst, the Cu-SCR catalyst comprising copper and a zeolite. The preferred Cu-SCR catalysts described elsewhere herein apply equally to this embodiment.

The system preferably further comprises a Cu-SCR catalyst located downstream of the Fe-SCR catalyst in an underfloor position, the Cu-SCR catalyst comprising copper and a zeolite. The preferred Cu-SCR catalysts described elsewhere herein apply equally to this embodiment.

Preferably, the ammonia precursor comprises urea.

In a further aspect, the present invention provides the use of the system of the above aspect in a method according to the first aspect. Accordingly, all preferred features and embodiments applying to the first aspect apply equally to the system of the invention, and vice versa.

In a further aspect, the present invention provides the use of an Fe-SCR catalyst, the Fe-SCR catalyst comprising iron and a zeolite, and an ANR of from greater than 2 to 6 to treat exhaust gas from a lean burn internal combustion engine containing 100 ppm or less $NO_x$. In an alternative aspect, the $NO_x$ is not particularly limited. Each of the preferred features and embodiments applying to the other aspects apply equally to this aspect of the invention.

The invention can also be defined according to one or more of the following statements:

1. A method of treating exhaust gas from a lean burn internal combustion engine, the method comprising: introducing ammonia or an ammonia precursor into the exhaust gas upstream of an Fe-SCR catalyst, the Fe-SCR catalyst comprising iron and a zeolite; and contacting the exhaust gas with the Fe-SCR catalyst; wherein the amount of ammonia or ammonia precursor introduced into the exhaust gas upstream of the Fe-SCR catalyst is controlled to provide an ammonia-to-$NO_x$ molar ratio (ANR) in the exhaust gas contacting the Fe-SCR catalyst of from greater than 2 to 6.
2. The method of 1, wherein the amount of ammonia or ammonia precursor introduced into the exhaust gas upstream of the Fe-SCR catalyst is controlled to provide an ANR in the exhaust gas contacting the Fe-SCR catalyst of from 3 to 5.
3. The method of 1 or 2, wherein the $NO_x$ concentration in the exhaust gas contacting the Fe-SCR catalyst is 100 ppm or less.
4. The method of 3, wherein the $NO_x$ concentration in the exhaust gas contacting the Fe-SCR catalyst is 50 ppm or less, preferably 10 ppm or less.
5. The method of any one of 1 to 4, wherein the ratio of concentration of NO to concentration of $NO_x$ in the exhaust gas contacting the Fe-SCR catalyst is 0.8 or greater.
6. The method of 5, wherein the ratio of concentration of NO to concentration of $NO_x$ in the exhaust gas contacting the Fe-SCR catalyst is 0.9 or greater.
7. The method of any one of 1 to 6, wherein the method further comprises reducing the concentration of $NO_x$ in the exhaust gas prior to the step of introducing ammonia or an ammonia precursor into the exhaust gas.
8. The method of 7, wherein the concentration of $NO_x$ in the exhaust gas exiting the lean burn internal combustion engine is greater than 100 ppm and reducing the concentration of $NO_x$ in the exhaust gas prior to the step of introducing ammonia or an ammonia precursor into the exhaust gas reduces the concentration of $NO_x$ in the exhaust gas to 100 ppm or less, preferably 50 ppm or less, more preferably 10 ppm or less.
9. The method of 7 or 8, wherein reducing the concentration of $NO_x$ in the exhaust gas prior to the step of introducing ammonia or an ammonia precursor into the exhaust gas comprises contacting the exhaust gas with a further SCR catalyst, an oxidation catalyst and/or a passive $NO_x$ adsorber (PNA) catalyst.
10. The method of 9, wherein the PNA catalyst comprises a platinum group metal (PGM), preferably Pd, disposed on a small-pore zeolite, preferably having a Framework Type comprising CHA and/or AEI.
11. The method of any one of 1 to 10, wherein the lean burn internal combustion engine is not a gasoline engine.
12. The method of any one of 1 to 11, wherein the lean burn internal combustion engine is a diesel engine, a hydrogen engine or an engine powered by liquid petroleum gas or natural gas.
13. The method of any one of 1 to 12, wherein the temperature of the exhaust gas contacting the Fe-SCR catalyst is 500° C. or less.
14. The method of 13, wherein the temperature of the exhaust gas contacting the Fe-SCR catalyst is 350° C. or less, preferably 300° C. or less, more preferably 200° C. or less.
15. The method of any one of 1 to 12, wherein: when the temperature of the exhaust gas contacting the Fe-SCR catalyst is at a predetermined threshold temperature or less, the amount of ammonia or ammonia precursor introduced into the exhaust gas upstream of the Fe-SCR catalyst is controlled to provide an ANR in the exhaust gas contacting the Fe-SCR catalyst of from greater than 2 to 6; and when the temperature of the exhaust gas contacting the Fe-SCR catalyst is greater than the threshold temperature, the amount of ammonia or ammonia precursor introduced into the exhaust gas upstream of the Fe-SCR catalyst is controlled to provide an ANR in the exhaust gas contacting the Fe-SCR catalyst of 2 or less.
16. The method of 15, wherein: when the temperature of the exhaust gas contacting the Fe-SCR catalyst is at the predetermined threshold temperature or less, the amount of ammonia or ammonia precursor introduced into the exhaust gas upstream of the Fe-SCR catalyst is controlled to provide an ANR in the exhaust gas contacting the Fe-SCR catalyst of from 3 to 5.
17. The method of 15 or 16, wherein the threshold temperature is 500° C.
18. The method of 17, wherein the threshold temperature is 350° C., preferably 300° C., more preferably 200° C.
19. The method of any one of 1 to 18, wherein the zeolite of the Fe-SCR catalyst comprises zeolite having a Framework Type selected from one or more of AEI, AFX, BEA, FER, MFI, FAU, LTA, LTL, CHA, or mixtures or intergrowths thereof.

20. The method of any one of 1 to 19, wherein the zeolite of the Fe-SCR catalyst comprises a medium-pore and/or large-pore zeolite.

21. The method of 19 or 20, wherein the zeolite of the Fe-SCR catalyst comprises a zeolite having a Framework Type comprising AEI, AFX, BEA and/or FER, preferably BEA.

22. The method of 21, wherein the zeolite of the Fe-SCR catalyst is beta zeolite.

23. The method of any one of 1 to 22, wherein the zeolite of the Fe-SCR catalyst has a silica-to-alumina molar ratio (SAR) of from about 7 to about 50.

24. The method of 23, wherein the zeolite of the Fe-SCR catalyst has a SAR of from about 10 to about 35, preferably about 20 to about 30, more preferably about 22 to about 28.

25. The method of 21, wherein the zeolite of the Fe-SCR catalyst has a SAR of about 25.

26. The method of any one of 1 to 25, wherein the zeolite of the Fe-SCR catalyst comprises iron disposed on the zeolite at a loading of from about 1 to about 7 wt. %, based on the weight of the zeolite, preferably about 2 to about 5 wt. %.

27. The method of any one of 1 to 26, wherein the Fe-SCR catalyst further comprises copper disposed on the zeolite.

28. The method of any one of 1 to 27, wherein the Fe-SCR catalyst is contained within or disposed on a substrate, the substrate comprising two or more catalyst zones and the Fe-SCR catalyst being contained within a first catalyst zone.

29. The method of 28, wherein a Cu-SCR catalyst is contained in a second catalyst zone different to the first catalyst zone, the Cu-SCR catalyst comprising copper and a zeolite.

30. The method of 29, wherein the second catalyst zone is located upstream of the first catalyst zone.

31. The method of any one of 1 to 26 further comprising contacting the exhaust gas with a Cu-SCR catalyst prior to contacting the exhaust gas with the Fe-SCR catalyst, the Cu-SCR catalyst comprising copper and a zeolite, wherein the Cu-SCR catalyst is located in a close coupled position upstream of the Fe-SCR catalyst.

32. The method of any one of 1 to 31 further comprising contacting the exhaust gas with a Cu-SCR catalyst downstream of the Fe-SCR catalyst, the Cu-SCR catalyst comprising copper and a zeolite, wherein the Cu-SCR catalyst is located downstream of the Fe-SCR catalyst in an underfloor position.

33. The method of any one of 1 to 32, wherein the ammonia precursor comprises urea.

34. A system for treating exhaust gas from a lean burn internal combustion engine, the system comprising: a reductant injector for introducing ammonia or an ammonia precursor into the exhaust gas; a substrate; an Fe-SCR catalyst contained within or disposed on the substrate, the Fe-SCR catalyst comprising iron and a zeolite; and an engine control unit; wherein the reductant injector is located upstream of the Fe-SCR catalyst; and wherein the engine control unit is configured to control the amount of ammonia or ammonia precursor introduced into the exhaust gas by the reductant injector during use such that the ammonia-to-$NO_x$ molar ratio (ANR) in the exhaust gas contacting the Fe-SCR catalyst is from greater than 2 to 6.

35. The system of 34, wherein the system further comprises the lean burn internal combustion engine.

36. The system of 34 or 35, wherein the engine control unit is configured to control the amount of ammonia or ammonia precursor introduced into the exhaust gas by the reductant injector during use such that the ANR in the exhaust gas contacting the Fe-SCR catalyst is from 3 to 6.

37. The system of any one of 34 to 36, wherein the system comprises a further SCR catalyst, an oxidation catalyst and/or a PNA catalyst upstream of the Fe-SCR catalyst.

38. The system of any one of 34 to 37, wherein the lean burn internal combustion engine is not a gasoline engine.

39. The system of any one of 34 to 38, wherein the lean burn internal combustion engine is a diesel engine, a hydrogen engine or an engine powered by liquid petroleum gas or natural gas.

40. The system of any one of 34 to 39, wherein the zeolite of the Fe-SCR catalyst comprises zeolite having a Framework Type selected from one or more of AEI, AFX, BEA, FER, MFI, FAU, LTA, LTL, CHA, or mixtures or intergrowths thereof.

41. The system of any one of 34 to 40, wherein the zeolite of the Fe-SCR catalyst comprises a medium-pore and/or large-pore zeolite.

42. The system of 40 or 41, wherein the zeolite of the Fe-SCR catalyst comprises a zeolite having a Framework Type comprising AEI, AFX, BEA and/or FER, preferably BEA.

43. The system of 42, wherein the zeolite of the Fe-SCR catalyst is beta zeolite.

44. The system of any one of 34 to 43, wherein the zeolite of the Fe-SCR catalyst has a silica-to-alumina molar ratio (SAR) of from about 15 to about 50.

45. The system of 44, wherein the zeolite of the Fe-SCR catalyst has a SAR of from about 15 to about 35, preferably about 20 to about 30, more preferably about 22 to about 28.

46. The system of 42, wherein the zeolite of the Fe-SCR catalyst has a SAR of about 25.

47. The system of any one of 34 to 46, wherein the zeolite of the Fe-SCR catalyst comprises iron disposed on the zeolite at a loading of from about 1 to about 7 wt. %, based on the weight of the zeolite, preferably about 2 to about 5 wt. %.

48. The system of any one of 34 to 47, wherein the Fe-SCR catalyst further comprises copper disposed on the zeolite.

49. The system of any one of 34 to 48, wherein the substrate comprises two or more catalyst zones, the Fe-SCR catalyst being contained within a first catalyst zone.

50. The system of 49, wherein a Cu-SCR catalyst is contained in a second catalyst zone different to the first catalyst zone, the Cu-SCR catalyst comprising copper and a zeolite.

51. The system of 50, wherein the second catalyst zone is located upstream of the first catalyst zone.

52. The system of any one of 34 to 47 further comprising a Cu-SCR catalyst located in a close coupled position upstream of the Fe-SCR catalyst, the Cu-SCR catalyst comprising copper and a zeolite.

53. The system of any one of 34 to 53 further comprising a Cu-SCR catalyst located downstream of the Fe-SCR catalyst in an underfloor position, the Cu-SCR catalyst comprising copper and a zeolite.

54. The system of any one of 34 to 53, wherein the ammonia precursor comprises urea.
55. Use of the system of any one of 34 to 54 in a method according to any of claims 1 to 33.
56. Use of an Fe-SCR catalyst, the Fe-SCR catalyst comprising iron and a zeolite, and an ANR of from greater than 2 to 6 to treat exhaust gas from a lean burn internal combustion engine containing 100 ppm or less $NO_x$.

The invention will now be described in relation to the following non-limiting examples.

EXAMPLES

Example 1—Method of Making Fresh 3.0wt % Fe/Beta Zeolite Catalyst and Honeycomb Monolith Substrate Coated Therewith Commercially available aluminosilicate Beta zeolite in the H-form was $NH_4^+$ ion exchanged in a solution of $NH_4NO_3$, then filtered. The resulting material was added to an aqueous solution of $Fe(NO_3)_3$ with stirring. The slurry was filtered, then washed and dried. The procedure can be repeated to achieve a desired metal loading. The final product was calcined.

Cordierite honeycomb (i.e., flow-through) cylindrical monolith substrate of dimensions 4.66 inches in diameter and 3 inches in length and having a wall thickness of 0.004 inches (4 mil) and a cell density of 400 cpsi (cells per square inch) were coated with the Fe/Beta zeolite (silica-to-alumina ratio (SAR) of 25) catalyst by adding the catalyst to deionized water to create a catalyst slurry also containing water-dispersible boehmite 10 wt % relative to the weight of the zeolite (as binder). The solids content of the slurry used to coat each substrate was 30%. The process disclosed in EP 1064094B1 was used to coat the substrates with the substrate. The resulting catalyst cores each had a loading of SCR catalyst composition of 2.4 g/in$^3$. The full substrate was first dried in flowing air at 105 Celsius and then calcined in a muffle oven at 500 Celsius for 4 hours. The resulting catalyst is referred to as "fresh" catalyst.

The "fresh" catalyst-coated substrate was hydrothermally aged in an oven box in an oven at 700° C. for a total of 10 hours wherein the oven temperature was increased at a "ramp rate" of 10° C. per minute starting from room temperature and pressure until the 700° C. temperature was reached. The 10-hour dwell-time did not begin until the 700° C. had been reached. A constantly replenished gas mixture of 10 vol % $O_2$/10% $H_2O/N_2$ balance controlled by mass flow and liquid flow controllers respectively was pumped into the oven box at a flow rate of 6 litres per minute. The honeycomb substrate cores were arranged within the oven box so that the channels extended vertically, and the flowing gas mixture was forced to enter the channels of each core disposed within the oven box from a lower end thereof.

A sample core having a diameter of 1 inch and a length of 3 inches was cut from the aged catalyst coated flow-through substrate. The resulting core is labelled as "Catalyst A".

Comparative Example 2—Method of Making Fresh Cu/Zeolite Catalysts and Honeycomb Monolith Substrate Coated Therewith A commercially available aluminosilicate AEI (SSZ-39) zeolite (SAR of 20) in the H-form was $NH_4^+$ ion exchanged in a solution of $NH_4NO_3$, then filtered. The resulting material was added to an aqueous solution of copper acetate with stirring. The slurry was filtered, then washed and dried. The procedure can be repeated to achieve a desired copper metal loading of 3.0 wt %. The final product was calcined.

Similarly, a commercially available aluminosilicate CHA zeolite (SAR of 23) in the H-form was $NH_4^+$ ion exchanged in a solution of $NH_4NO_3$, then filtered. The resulting material was added to an aqueous solution of copper acetate with stirring. The slurry was filtered, then washed and dried. The procedure can be repeated to achieve a desired copper metal loading of 2.0 wt %. The final product was calcined.

The Cu/AEI and Cu/CHA zeolite catalysts thus prepared were each coated onto separate bare cordierite honeycomb (i.e., flow-through) cylindrical monolith substrates identical to that used for the Fe/BEA zeolite catalyst of Example 1, both coated substrates were aged in an identical way to the substrate coated with Fe/BEA zeolite; and cores of identical size were cut from each aged substrate for testing. The comparative Cu/AEI zeolite catalyst was labelled as "Catalyst B"; and the comparative Cu/CHA zeolite catalyst was labelled as "Catalyst C".

Example 3—Evaluation of $NO_x$ Conversion

The catalyst cores prepared in Example 1 and Comparative Example 2 above were evaluated for $NO_x$ conversion activity. All aged cores were tested in a laboratory selective catalytic activity test (SCAT) apparatus using the following gas mixture, including an ammonia reductant: 75 ppm NO, "X" ppm $NH_3$ (depending on the ammonia to $NO_3$ ratio (ANR) to be used (see Tables 1 and 2 hereinbelow), 10% $O_2$, 8% $CO_2$, 5% $H_2O$, $N_2$ balance.

Results for $NO_x$ conversion at various ANRs at 175° C. and 300° C. are set out in Tables 1 and 2 below.

TABLE 1

| Catalyst Sample | % $NO_x$ Conversion at 175° C. | | | | |
|---|---|---|---|---|---|
| | ANR = 1 | ANR = 2 | ANR = 3 | ANR = 4 | ANR = 5 |
| A | 14 | 31 | 52 | 63 | 71 |
| B | 20 | 24 | 23 | 29 | 27 |
| C | 14 | 21 | 24 | 26 | 29 |

TABLE 2

| Catalyst Sample | % $NO_x$ Conversion at 300° C. | | | | |
|---|---|---|---|---|---|
| | ANR = 1 | ANR = 2 | ANR = 3 | ANR = 4 | ANR = 5 |
| A | 49 | 64 | 78 | 88 | 91 |
| B | 72 | 80 | 82 | 85 | 87 |
| C | 73 | 80 | 83 | 85 | 86 |

It can be seen from the results shown in Tables 1 and 2 that at the low temperature of 175° C., very surprisingly, the $NO_x$ conversion of the aged Fe/BEA aluminosilicate zeolite significantly improves relative to the two comparative Cu/zeolite samples. At the higher reaction temperature point of 300° C., the $NO_x$ conversion of the Fe/BEA aluminosilicate zeolite catalyst is also improved at higher ANRs.

The foregoing detailed description has been provided by way of explanation and illustration and is not intended to limit the scope of the appended claims. Many variations in the presently preferred embodiments illustrated herein will be apparent to one of ordinary skill in the art and remain within the scope of the appended claims and their equivalents.

For the avoidance of any doubt, the entire content of any and all documents cited herein is incorporated by reference into the present application.

The invention claimed is:

1. A method of treating exhaust gas from a lean burn internal combustion engine, the method comprising:
   introducing ammonia or an ammonia precursor into the exhaust gas upstream of an Fe-SCR catalyst, the Fe-SCR catalyst comprising iron and a zeolite; and
   contacting the exhaust gas with the Fe-SCR catalyst;
   wherein the amount of ammonia or ammonia precursor introduced into the exhaust gas upstream of the Fe-SCR catalyst is controlled to provide an ammonia-to-$NO_x$ molar ratio (ANR) in the exhaust gas contacting the Fe-SCR catalyst of from greater than 2 to 6 when the temperature of the exhaust gas contacting the Fe-SCR catalyst is at a predetermined threshold temperature or less; and
   wherein the amount of ammonia or ammonia precursor introduced into the exhaust gas upstream of the Fe-SCR catalyst is controlled to provide an ANR in the exhaust gas contacting the Fe-SCR catalyst of 2 or less when the temperature of the exhaust gas contacting the Fe-SCR catalyst is greater than the threshold temperature.

2. The method of claim 1, wherein the amount of ammonia or ammonia precursor introduced into the exhaust gas upstream of the Fe-SCR catalyst is controlled to provide an ANR in the exhaust gas contacting the Fe-SCR catalyst of from 3 to 5 when the temperature of the exhaust gas contacting the Fe-SCR catalyst is at a predetermined threshold temperature or less.

3. The method of claim 1, wherein the $NO_x$ concentration in the exhaust gas contacting the Fe-SCR catalyst is 100 ppm or less.

4. The method of claim 1, wherein the ratio of concentration of NO to concentration of $NO_x$ in the exhaust gas contacting the Fe-SCR catalyst is 0.8 or greater.

5. The method of claim 1, wherein the method further comprises reducing the concentration of $NO_x$ in the exhaust gas prior to the step of introducing ammonia or an ammonia precursor into the exhaust gas.

6. The method of claim 5, wherein reducing the concentration of $NO_x$ in the exhaust gas prior to the step of introducing ammonia or an ammonia precursor into the exhaust gas comprises contacting the exhaust gas with a further SCR catalyst, an oxidation catalyst and/or a passive $NO_x$ adsorber (PNA) catalyst.

7. The method of claim 1, wherein the lean burn internal combustion engine is a diesel engine, a hydrogen engine or an engine powered by liquid petroleum gas or natural gas.

8. The method of claim 1, wherein the temperature of the exhaust gas contacting the Fe-SCR catalyst is 500° C. or less.

9. The method of claim 1, wherein the zeolite of the Fe-SCR catalyst comprises zeolite having a Framework Type selected from one or more of AEI, AFX, BEA, FER, MFI, FAU, LTA, LTL, CHA, or mixtures or intergrowths thereof.

10. The method of claim 9, wherein the zeolite of the Fe-SCR catalyst comprises a zeolite having a Framework Type comprising AEI, AFX, BEA and/or FER.

11. The method of claim 1, wherein the zeolite of the Fe-SCR catalyst has a silica-to-alumina molar ratio (SAR) of from about 7 to about 50.

12. The method of claim 1, wherein the zeolite of the Fe-SCR catalyst comprises iron disposed on the zeolite at a loading of from about 1 to about 7 wt. %, based on the weight of the zeolite.

13. The method of claim 1, wherein the Fe-SCR catalyst further comprises copper disposed on the zeolite.

14. The method of claim 1, wherein the Fe-SCR catalyst is contained within or disposed on a substrate, the substrate comprising two or more catalyst zones and the Fe-SCR catalyst being contained within a first catalyst zone.

15. The method of claim 14, wherein a Cu-SCR catalyst is contained in a second catalyst zone different to the first catalyst zone, the Cu-SCR catalyst comprising copper and a zeolite.

16. The method of claim 15, wherein the second catalyst zone is located upstream of the first catalyst zone.

17. A system for treating exhaust gas from a lean burn internal combustion engine, the system comprising:
   a reductant injector for introducing ammonia or an ammonia precursor into the exhaust gas;
   a substrate;
   an Fe-SCR catalyst contained within or disposed on the substrate, the Fe-SCR catalyst comprising iron and a zeolite; and
   an engine control unit;
   wherein the reductant injector is located upstream of the Fe-SCR catalyst; and
   wherein the engine control unit is configured to control the amount of ammonia or ammonia precursor introduced into the exhaust gas by the reductant injector during use such that the ammonia-to-$NO_x$ molar ratio (ANR) in the exhaust gas contacting the Fe-SCR catalyst is from greater than 2 to 6 when the temperature of the exhaust gas contacting the Fe-SCR catalyst is at a predetermined threshold temperature or less; and
   wherein the engine control unit is configured to control the amount of ammonia or ammonia precursor introduced into the exhaust gas upstream of the Fe-SCR catalyst to provide an ANR in the exhaust gas contacting the Fe-SCR catalyst of 2 or less when the temperature of the exhaust gas contacting the Fe-SCR catalyst is greater than the threshold temperature.

18. The system of claim 17, wherein the system further comprises the lean burn internal combustion engine.

19. The system of claim 17, wherein the system comprises a further SCR catalyst, an oxidation catalyst and/or a PNA catalyst upstream of the Fe-SCR catalyst.

* * * * *